(12) United States Patent
Wilkey et al.

(10) Patent No.: US 6,857,255 B1
(45) Date of Patent: Feb. 22, 2005

(54) RECIPROCATING CUTTING BLADE HAVING LASER-HARDENED CUTTING EDGES AND A METHOD FOR MAKING THE SAME WITH A LASER

(75) Inventors: Richard L. Wilkey, Hartland, WI (US); Darrel Lee Turner, Reeseville, WI (US)

(73) Assignee: Fisher-Barton LLC, Waukesha, WI (US)

( * ) Notice: Subject to any disclaimer, the term of this patent is extended or adjusted under 35 U.S.C. 154(b) by 0 days.

(21) Appl. No.: 10/438,548

(22) Filed: May 15, 2003

Related U.S. Application Data (60) Provisional application No. 60/380,883, filed on May 16, 2002.

(51) Int. Cl.[7] ............................................... A01D 34/13
(52) U.S. Cl. ........................................................ 56/296
(58) Field of Search .......................... 56/246, 291, 244, 56/292; 382/141, 145, 148, 149; 219/7.5, 10.77, 10.91

(56) References Cited

U.S. PATENT DOCUMENTS

| | | |
|---|---|---|
| 513,834 A | 1/1894 | Smith |
| 2,869,311 A | 11/1959 | Beeston, Jr. |
| 3,882,579 A | 5/1975 | Peacock |
| 3,988,955 A | 11/1976 | Engel et al. |
| 4,109,127 A | 8/1978 | Frungel |
| 4,147,570 A | 4/1979 | Corbo et al. |
| 4,151,014 A | 4/1979 | Charschan et al. |
| 4,290,326 A * | 9/1981 | Ibach et al. ................ 76/101.1 |
| 4,459,458 A | 7/1984 | Vetsch et al. |
| 4,533,812 A | 8/1985 | Lorenz |
| 5,114,499 A | 5/1992 | Kusunoki |
| 5,131,957 A | 7/1992 | Epstein et al. |
| 5,145,530 A | 9/1992 | Cassady |
| 5,181,321 A | 1/1993 | Gouttebarge |
| 5,251,514 A | 10/1993 | Rhodarmer et al. |
| 5,297,637 A | 3/1994 | Rowlett |
| 5,394,612 A | 3/1995 | Wolfington |
| 5,446,258 A | 8/1995 | Mordike |
| 5,447,580 A | 9/1995 | Semiatin et al. |
| 5,575,185 A | 11/1996 | Cox et al. |
| 5,845,474 A * | 12/1998 | Loftus .......................... 56/291 |
| 5,906,053 A | 5/1999 | Turner et al. |
| 6,292,584 B1 * | 9/2001 | Dulaney et al. ............ 382/151 |

* cited by examiner

*Primary Examiner*—Robert E. Pezzuto
(74) *Attorney, Agent, or Firm*—Michael Best & Friedrich LLP

(57) ABSTRACT

A reciprocating cutting blade includes a body portion having an top surface, a bottom surface, a longitudinal axis, a first working portion extending at an angle to the longitudinal axis and defining a first cutting surface, a second working portion extending at an angle to the longitudinal axis and defining a second cutting surface. A laser-hardened region extends along at least part of one of the first and second working portions, and preferably along at least part of both of the first and second working portions. The working portions can be serrated to include alternating teeth and roots. The teeth can be laser hardened more than the roots.

25 Claims, 8 Drawing Sheets

RECIPROCATING CUTTING BLADE HAVING LASER-HARDENED CUTTING EDGES AND A METHOD FOR MAKING THE SAME WITH A LASER

RELATED APPLICATIONS

This application claims priority to U.S. Provisional Patent Application No. 60/380,883 filed May 16, 2002.

FIELD OF THE INVENTION

The invention relates to reciprocating cutting blades and methods for manufacturing reciprocating cutting blades. More particularly, the invention relates to reciprocating cutting blades and methods for manufacturing reciprocating cutting blades which provide cutting edges having a high hardness and which have the necessary toughness to sustain high-energy impacts.

BACKGROUND OF THE INVENTION

Reciprocating cutting blades, often referred to as sickle sections, are commonly used in machines that cut forage (e.g., for cattle feed) and that cut grain (e.g., prior to thrashing to collect the seed). Other uses include tea leaf harvesting and landscaping applications, such as hedge trimming. Even some underwater weed cutters utilize similar sickle section configurations. The sickle sections are typically triangular-shaped knives having two sharpened edges. The sharpened edges are often also serrated to improve cutting performance. A plurality of sickle sections is attached to a cutter bar that oscillates or reciprocates back and forth in a direction substantially perpendicular to the cutting path through the crop. The cutter bar and the attached sickle sections are typically mounted for oscillation near the base of the crop stems, just above the ground. The sickle sections cooperate with a stationary blade, called a guard, to create a shearing action that cuts the crop.

Sickle sections are subject to wear by the fibrous stalks of the crop being cut, sand, and other abrasive materials carried into the sections during cutting. Increasing the hardness of the sickle sections improves resistance to wear due to normal cutting conditions. However, increasing the hardness of the sickle section also tends to increase the brittleness of the section and reduces the capacity of the knife to withstand cracking under impact forces created by foreign objects encountered by the section. Even though the guards substantially prevent the intrusion of most large objects, some will inevitably get through and impact the knife with loads high enough to cause cracking and/or breakage.

Furthermore, the cutting edges are also subject to deformation by smaller pebbles, rocks, and other debris. This deformation has the effect of dulling the cutting edges without necessarily removing material from the blade. Dull cutting edges may be perceived as having been worn dull. Also, dull cutting edges do not cut the stalks as cleanly, thereby reducing the quality of cut.

One way of manufacturing a sickle section to meet the various design criteria is to treat the section after it is formed. It is commonly known to harden a sickle section using a variety of methods. One such method is to induction harden the material along the two cutting edges of the section. Such induction hardening processes, using a high-carbon, spring grade of steel (e.g., 1074 annealed steel), can result in a hardened area along the cutting edges having a hardness of about 50–55 Rc.

For cutting under more hostile conditions, it has been known to dip or otherwise coat the previously induction-hardened sickle section in a chromium solution to plate the entire sickle section. In addition to improved corrosion resistance, the hard chrome plating provides a hard skin that further improves the toughness at the cutting edges.

Another known method of hardening sickle sections is through austempering. Austempered sickle sections will typically have a hardness of about 48–52 Rc through the entire blade.

SUMMARY OF THE INVENTION

For most cutting applications, induction-hardened blades are still susceptible to cracking due to impact forces occurring at the cutting edges. Once cracks are formed, they will continue to propagate through the hardened area and into the non-hardened portions of the blade. The inability to withstand impact loading, and the resulting tendency to crack, is magnified by the thin, serrated portions of the cutting edges.

Additionally, the chrome plating process is relatively cost prohibitive in light of existing regulations aimed at preventing chromium from entering the environment. Another problem with chrome plating is the possibility of embrittling the underlying steel due to the entrapment of hydrogen molecules during the plating process. This phenomenon is commonly known as hydrogen embrittlement and is particularly common with the types of high-carbon steels commonly used to manufacture sickle sections. To minimize the occurrence of hydrogen embrittlement, the plated sickle sections are typically baked to relieve entrapped hydrogen. This adds additional time and cost to the manufacturing process.

The invention provides an improved reciprocating cutting blade or sickle section and a method for making the sickle section. More specifically, the invention provides a sickle section having a high degree of toughness so as to absorb the energy of impacts, and provides cutting regions having a high degree of wear resistance. The invention provides a sickle section with more resistance to edge dulling from deformation since the strength of the cutting edges is significantly higher. The invention also provides a self-sharpening effect.

In one embodiment, the invention provides a sickle section that is first through hardened using conventional heat treating measures (e.g., induction heating, quenching, and tempering) at least in the vicinity of the cutting edges, if not over the entire section. This initial heat treatment results in a blade having portions initially hardened to a range approximately between 40–58 Rc depending on part material, thickness, geometry and the heat treating process used. At this point, the blade has a relatively hard surface but retains sufficient impact resistance. Next, portions of the cutting edges (e.g., the areas under the bevels or the beveled surfaces themselves) are laser hardened along the length of the cutting edges to provide select areas along the cutting edge that are hardened to at least 60 Rc, and more preferably to approximately 64–68 Rc.

In another embodiment, the sickle section is serrated to include alternating teeth and roots. The laser-hardening process can be performed so that portions of the teeth are laser hardened more than portions of the roots. The resulting laser-hardened serrated surfaces wear in a preferential pattern that will substantially maintain the serrations over the life of the blade.

Other features and advantages of the invention will become apparent to those skilled in the art upon review of the following detailed description, claims, and drawings.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION

The Work Piece

FIGS. 1–4 illustrate a metal work piece, such as a reciprocating sickle type cutting blade or section 10, which can be hardened through the application of a laser beam to portions of the sickle section 10. In the illustrated embodiment, the sickle section 10 is substantially triangular in shape and includes a body 14 defined by a first or rear edge 18 and laterally spaced second or side edges 22 that intersect the rear edge 18 and are substantially normal to the rear edge 18. Working portions 26 extend from the spaced side edges 22 and intersect at a blade tip or apex 30. A longitudinal axis 34 passes through the apex 30 and extends toward and is substantially normal to the rear edge 18. In the illustrated embodiment, the working portions 26 are in substantially mirrored relationship to one another with respect to the longitudinal axis 34, and each working portion 26 is angled (i.e., not parallel) relative to the longitudinal axis 34.

The body 14 further includes a top surface 38 and a bottom surface 42. The thickness of the body 14 between the top and bottom surfaces 38, 42 will vary depending on the cutting application. Mounting holes 46 extend between the top and bottom surfaces 38, 42 adjacent the rear edge 18 for mounting the sickle section 10 to the cutter bar (not shown). When mounted to the cutter bar, the sickle section 10 will reciprocate linearly in the directions illustrated by the arrows M. As shown in FIGS. 1–4, the working portions 26 have a beveled cutting surface 48 extending between the top and bottom surfaces 38, 42. The intersections between the beveled surfaces 48 and the bottom surface 42 define cutting edges 52 that extend along the length of the working portions 26. In the illustrated embodiment, the beveled surface forms an angle with the bottom surface 42 of approximately 20–30 degrees.

The sickle section 10 is made of a spring grade of steel, and is preferably 1074 annealed steel, or AISI 10B38 grade steel sold under the name MARBAIN and available from Fisher Barton Blades, Inc. of Watertown, Wis. However, other grades of steel can also be successfully used as material for the sickle section 10. For example, the section 10 can be made of any of a group of materials including the following grades of steel: AISI 5140 through 5160; 51B35 through 51B60; 5135H through 5160H; 6150 and 6150H; 4140 through 4161; 4141H through 4161H; 9255 through 9260; 9255H through 9260H; 1541 through 1566; 15B35H through 15B62H; 1037 through 1095; and 10B37 through 10B60, as well as other equivalent chemistries.

The sickle section 10 is formed through conventional fabrication processes such as, for example, stamping, coining, shearing, grinding, shaving, or milling, or by a combination of these processes according to the design requirements of the section 10. It should be understood that there are numerous configurations for sickle sections, and that the section 10 illustrated in FIGS. 1–4 is only one example. The specific geometry, mounting hole configurations, and working portion configurations will vary depending on the application.

After having been formed and/or machined, the section 10 can be further fabricated through hardening, such as by heat treating the body 14 of the section 10. Any one of several heat treating methodologies can be successfully used to harden the body 14 of steel material, and preferably the body 14 of steel is treated so as to attain a hardness of about 40 Rc to 58 Rc. In the illustrated embodiment, the section 10 is initially hardened only locally in the vicinity of the working portions 26. The working portions 26 are preferably through hardened via induction heating, quenching, and then tempering in a zone extending about 0.250.5 inches inwardly from the cutting edges 52 along the length of the working portions 26 (as represented by the dashed line H in FIGS. 3 and 4). Of course, the entire body 14 of the section 10 or other localized portions can be initially hardened in this manner if desired.

Other heat treating processes that can be successfully used for heat treating or through hardening the body 14 are austempering, austempering and tempering, martempering, quenching, and tempering. Heat treatment of the body 14 of a section 10 made of the above described steels results in the section 10 having a hard surface but that retains sufficient impact resistance and bending resistance for use as a reciprocating cutter section. Additionally, the laser-hardening process discussed below could be used on sections that have not undergone any initial hardening process or could be used on section where the heat treating step(s) are completed before forming and machining.

After the section 10 has been formed, machined, and/or initially hardened, portions of the section 10 are subjected to a laser beam hardening process to enhance the wear characteristics of the working portions 26 and the cutting edges 52. Specifically, portions of the bottom surface 42 along the working portions 26, the cutting edges 52, and portions of the beveled surfaces 48 can be hardened through application of a laser. In addition to increasing the wear characteristics, the laser hardening results in a self-sharpening effect as the portions of the beveled surfaces 48 closer to the top surface 38 will wear slightly faster than the cutting edges 52 and the portions of the beveled surfaces 48 directly adjacent the cutting edges 52. This wear pattern yields a self-sharpening working portion 26.

The Laser Apparatus

Figure 20:
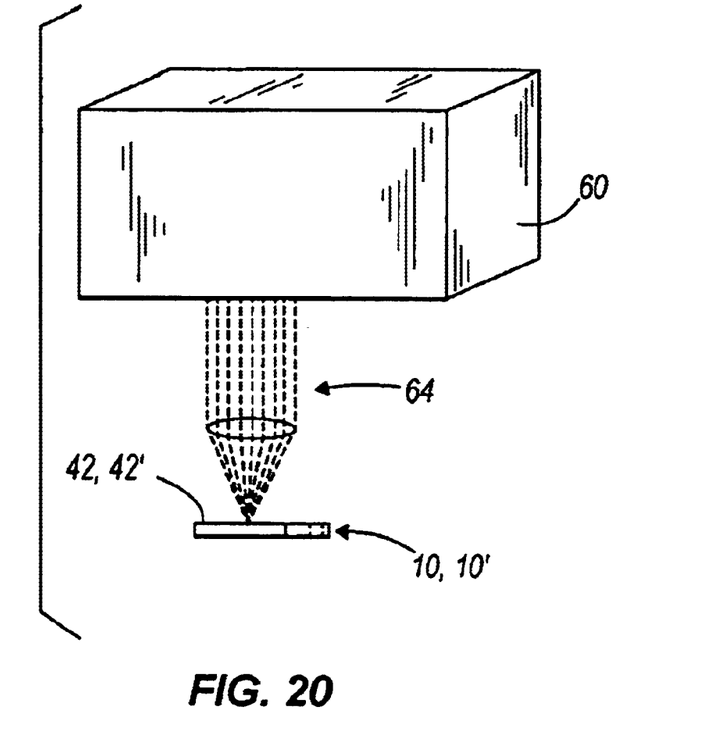
FIG. 20 is a schematic view illustrating an apparatus for providing a beam of laser radiation for treating a workpiece such as the sickle sections of FIGS. 1–19.

A laser 60 (shown schematically in FIG. 20), typically, but not limited to, $CO_2$ or Nd:YAG can be used. While other laser apparatus are believed to be suitable, a 6 KW $CO_2$ laser operating at 85% power can be successfully used. The beam 64 of the laser 60 is focused to a suitable size and shape for the laser and work piece application. The section 10 is moved relative to the laser beam 64 or the beam 64 may be moved relative to the section 10. Of course, a hybrid of the two may be most suitable. While the relative speed and pattern of travel between the section 10 and the laser beam 64 are variables that may be optimized for the laser hardening of the section 10, in a preferred embodiment of the invention, the beam of laser radiation 64 is generally rectangular in cross section such that the beam 64 is approximately 3/8 inch wide and has a relatively narrow thickness or depth on the order of less than 1/10 inch. The appropriate rate of travel of the beam 64 along the work piece will depend on the thickness of the beam 64, the depth or thickness of the section 10 to be hardened, and the material to be used. However rates of travel of 45–100 inches per minute can be successfully used. As discussed below, it is believed that the relatively rapid heating and the immediately following cooling of the portion hardened by exposure to the laser beam 64 is an important aspect of the invention. Accordingly, the relationships of the width or swath of the beam 64, the thickness of the beam 64 and the rate of travel are interdependent factors in optimizing the laser-hardening process.

Treatment of the Blade with the Laser

The portions of the section 10 to be hardened for use as a reciprocating cutter section are the portions of the bottom surface 42 of the section 10 underlying the working portions 26. It should be understood, however, that within the parameters set forth below, any portion of the section 10 can be successfully hardened through application of the laser. For example, the beveled surfaces 48 are susceptible to erosion wear. Laser hardening the surfaces 48 improves the life and discharge performance of the section 10.

Figure 1:
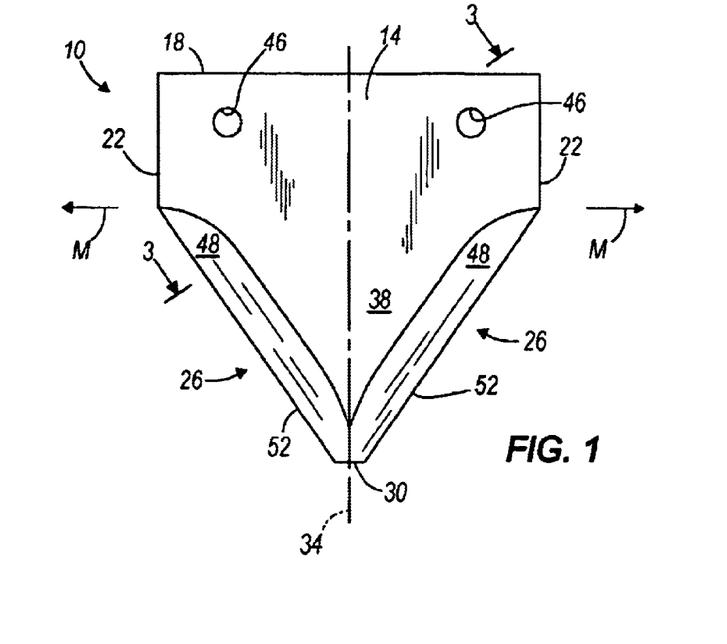
FIG. 1 is top view of a sickle section embodying the invention.
Figure 2:
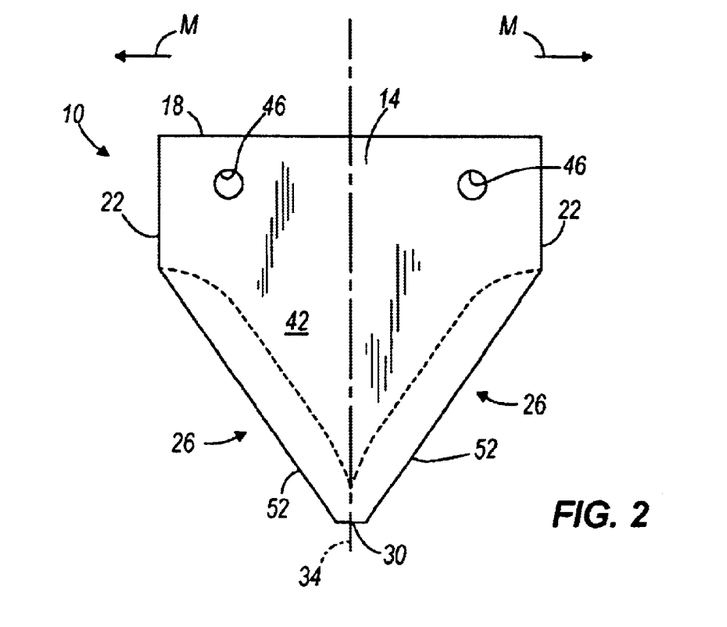
FIG. 2 is a bottom view of the sickle section of FIG. 1.
Figure 3:
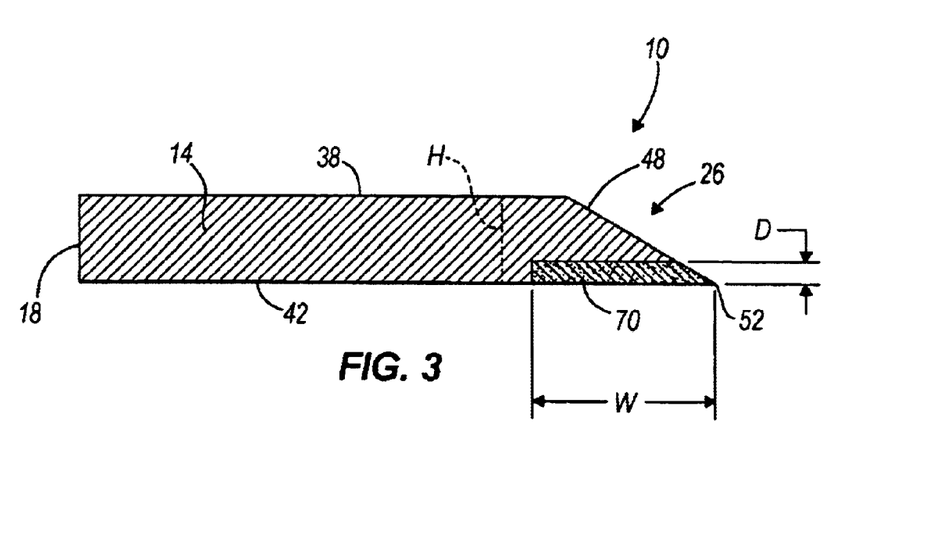
FIG. 3 is a section view taken along line 3—3 of FIG. 1.
Figure 4:
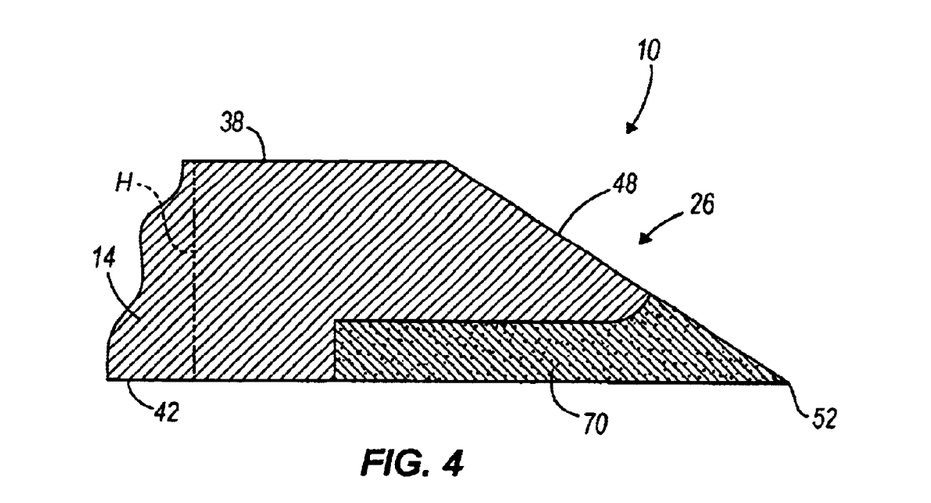
FIG. 4 is an enlarged partial section view of FIG. 3.
Figure 5:
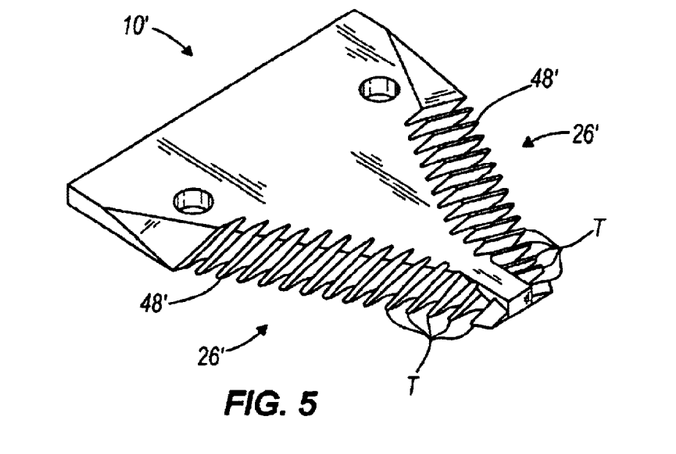
FIG. 5 is a perspective view of another sickle section embodying the invention.
Figure 6:
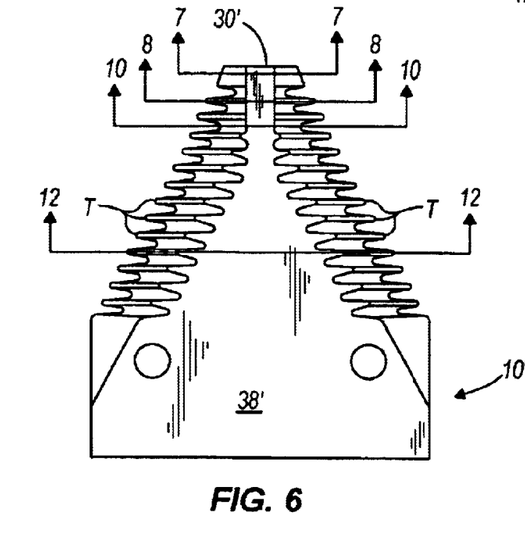
FIG. 6 is a top view of the sickle section of FIG. 5.

More particularly, the portion of the section 10 to be hardened through application of the laser beam 64 is indicated by a dotted region and reference numeral 70 in FIGS. 3 and 4. The laser-hardened region 70 extends inwardly from the cutting edge 52 of the section 10 at a thickness or depth D of approximately 0.010–0.040 inches, and more preferably of approximately 0.020 inches, and has a width W of approximately 0.25 inches extending from the cutting edge 52 toward the longitudinal axis 34. Of course, the depth D and width W may vary depending on the size of the section. As shown in FIG. 4 and for reasons explained below, the thickness or depth D of the laser-hardened region 70 of the section 10 may be greater in the portion of the section 10 adjacent the cutting edge 52 where the material thickness is thinner than in portions further from the cutting edge 52.

To harden the region 70, the laser beam 60 is focused onto the bottom surface 42 at the appropriate distance inwardly from the cutting edge 52 so that the beam 64 travels within the area of the bottom surface 42 to be hardened. The beam 64 is moved, and/or the section 10 is moved relative to the laser beam 64, in a direction substantially parallel to the cutting edge 52 along the extent of the bottom surface 42 defined by region 70 at the rate appropriate for the laser and part requirements.

As the beam 64 moves along the undersurface 42, the affected material of the section 10 is heated so as to have a temperature believed to be in the range of 1,400–1,900 F. The temperature, and time at temperature, must be sufficient to form austenite. Austenite is a solid solution of carbon and iron, and the formation of austenite is needed to make the transformation of the blade material to a hard structure upon quenching. Because the laser beam 64 is relatively narrow in relation to the direction of movement of the beam along the undersurface 42, the beam 64 is therefore applied to a particular portion of the section 10 for a relatively short period of exposure. After the beam 64 passes a portion of the section 10, heat in the particular heated region of the section 10 rapidly dissipates into the surrounding material, and the heated material, austenite, cools rapidly to form hard martensite or martensite and carbide.

The portions of the section 10 adjacent the heated region 70 of the section 10 act as a heat sink drawing energy from the heated area. The relatively large mass of the section 10 adjacent to heated region 70 draws the thermal energy away at a high rate, effectively quenching the heated region 70. This effect is believed to cause a high degree of hardness as well as a high degree of toughness in the material. The hardness of the laser-hardened region 70 using the above described processing is in the range of 60–70 Rc, and preferably about 66 Rc, which is higher than the hardness that can be achieved through conventional heat treating methods.

As to the portion of the section 10 adjacent the cutting edge 52, because there is less material to absorb thermal energy from the laser beam 64 in that portion, the depth of the hardened material is somewhat greater adjacent the cutting edge 52 than in locations spaced from the cutting edge 52. This result advantageously provides a cutting edge 52 and a portion of the beveled surface 48 that is hardened by application of the laser beam 64 to the undersurface 42. If, however, the laser beam 64 is kept further from the cutting edge 52 during radiation application, a more uniform depth of the region 70 can be achieved.

Because the prior microstructure is tempered martensite or a form of bainite, and because this structure is heated rapidly and thereafter quenched without delay, the new structure has a very fine grain. It is believed this fine grain structure results in higher toughness, relative to hardness, than could be achieved with conventional heat treat processes.

Because the laser-hardened regions 70 are not an added layer of wear resistant material, as is the case with a spray-bonded coating or hardfacing, it is an integral portion of the blade. In this regard, there is a narrow heat affected zone or boundary between the laser-hardened region 70 and the material adjacent the hardened zone. This heat affected zone is slightly softer than either the body 14 of the section 10 or the laser-hardened region 70 and is believed to be ductile enough to prevent separation. However, it is also believed the zone boundary is narrow enough and strong enough to support the laser-hardened region 70. Without support, even though somewhat ductile, the material in the laser-hardened region 70 would bend and fracture. Because the laser-hardened regions 70 do not change the thickness of the section 10, no adjustments to the cutter bar, the guard, or the thickness of the section 10 need be made.

No pre-heating of the section 10 is necessary for treatment of the section 10 with the laser 60. However, in some applications, the laser beam 64 may be reflected away from the surface of the section 10 to the degree the section surface is reflective. For example, a highly polished blade steel would reflect a large percentage of the beam 64 and result in very little energy input to heat the steel. Reflectivity is negligible, however, when the section 10 is heat treated to produce a black oxide layer on the surface. Such an oxide layer can be formed, for example by salt austempering. In this heat treat hardening process, water may be added to the salt quench to aid in achieving a high quench rate. The part surface will form a very thin, slightly rough black iron oxide layer in the presence of the steam produced by quenching. This black oxide layer greatly reduces opportunity for beam reflection and, as a result, tends to increase the effectiveness of the laser-hardening process. This black oxide layer also reduces cost by eliminating a separate operation to blacken or otherwise condition the blade surface for laser hardening.

Also, no quenching of the section 10 is necessary after the application of the laser-hardening process, although very thin blades with low self quenching mass may need assisted quenching. Low hardenability material will also benefit from assisted quenching if a deep laser-hardened region is needed. Furthermore, no tempering of the section 10 is necessary after the application of the laser-hardening process. Usually, materials hardened to between 60–70 Rc require tempering to make the material less brittle and more usable, however, material laser hardened with this method is tough enough to use as is. The process can be easily automated, and no special handling of the blades is required either before or after the laser-hardening process.

Because this laser-hardening process is applied to a fairly small portion of the section 10, the remainder of the section 10 retains a high toughness and can absorb the energy of a high-speed impact with a hard object. Also, the region of the section 10 hardened by the laser-hardening process is highly resistant to the wearing conditions of normal mowing, cutting and chopping, and is also impact resistant.

Figure 18:
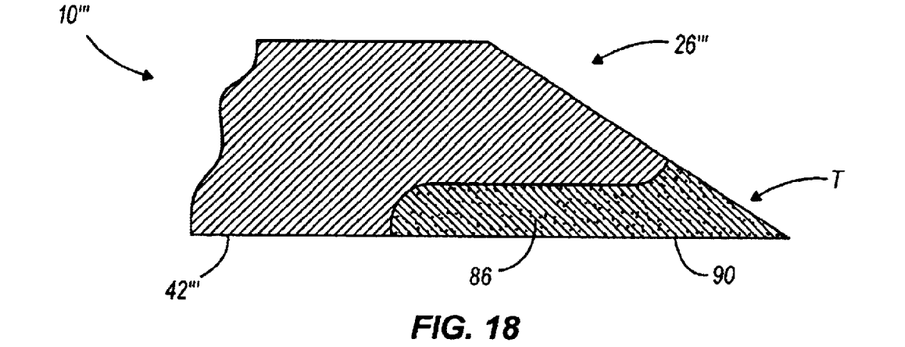
FIG. 18 is an enlarged partial section view taken through the tooth of an alternative sickle section that is serrated along the bottom surface.
Figure 19:
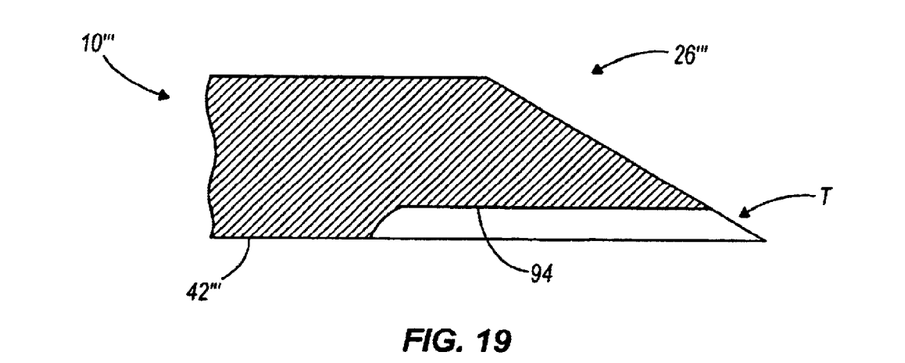
FIG. 19 is an enlarged partial section view taken through the root between two teeth of an alternative sickle section that is serrated along the bottom surface.

FIGS. 5–13 illustrate a sickle section 10' that is similar to the section 10, but that includes serrated working portions 26' having a plurality of teeth T. The individual teeth T formed by the serrations have been exaggerated in the figures for clarity, but in actuality a tooth depth from tip to root may be between 0.080–0.090 inches. While the teeth T are shown formed on the top side of the beveled surfaces 48', they can alternatively be formed in the bottom surface 42', as shown in FIGS. 18 and 19. The serrations can be made by plunge grinding, broaching, milling, shearing, shaving, coining, or similar techniques.

The sickle section 10' shown in FIGS. 5–13 can be laser hardened in the same manner described above with respect to the section 10. The configuration of the teeth T will alter the laser-hardened region 70' somewhat and some modifications to the laser application process can be made, if desired. For example, the laser beam 64 can be pulsed on and off in time with the passing of the consecutive teeth under the beam 64 so that the roots between the consecutive teeth are somewhat softer than the teeth T. In other words, the laser beam 64 would remain on as a tooth T passes the beam 64, but would be turned off as a root between two teeth T passes the beam 64. The benefits of such a modification will be discussed below with respect to the sections 10", 10'".

Figure 7:
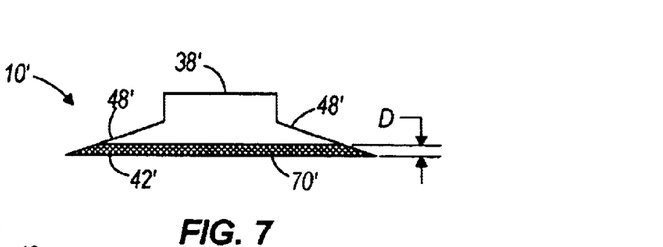
FIG. 7 is a section view taken along line 7—7 of FIG. 6 with the section lines removed for clarity.

FIG. 7 illustrates the laser-hardened region 70' formed at the first tooth T adjacent the apex 30'. As seen in FIG. 7, the laser-hardened region 70' has a depth D of approximately 0.010–0.040 inches, and more preferably of approximately 0.020 inches. Note that in FIG. 7 and all of the other cross-sectional views taken through a tooth T of the section 10', the cross-section lines have been removed for clarity. The region 70' extends across the entire width of the first tooth T, however, the region 70' can be formed in two separate stages as the working portions 26' are laser hardened separately. Alternatively, the first tooth T need not be laser hardened at all as this first tooth typically does not see the wear and impact forces of the teeth further away from the apex 30'.

Figure 8:
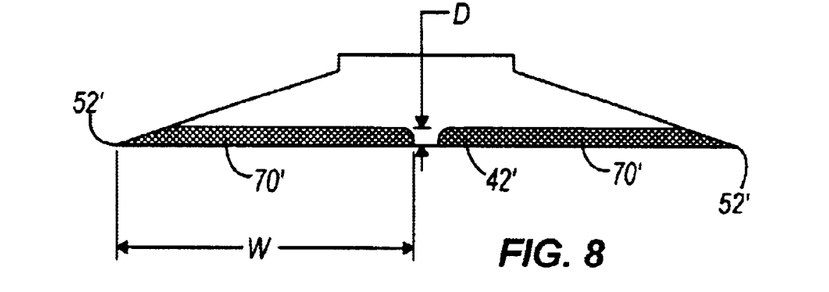
FIG. 8 is a section view taken along line 8—8 of FIG. 6 with the section lines removed for clarity.

FIG. 8 illustrates the laser-hardened regions 70' formed at the second teeth T from the apex 30' on either working portion 26'. As seen in FIG. 8, the laser-hardened regions 70' have a depth D of approximately 0.010–0.040 inches, and more preferably of approximately 0.020 inches. Each of the regions 70' has a width W of approximately 0.50 inches from the cutting edges 52'.

Figure 9:
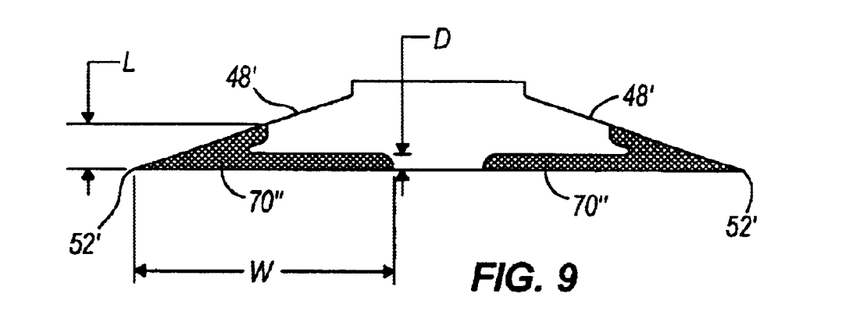
FIG. 9 is a section view similar to FIG. 8, with the section lines removed for clarity, showing an alternative embodiment of the invention.

FIG. 9 illustrates alternate laser-hardened regions 70" formed at the second teeth T from the apex 30'. The depth D remains approximately 0.010–0.040 inches, and more preferably of approximately 0.020 inches, however, each of the regions 70" has a width W of approximately 0.38 inches from the cutting edges 52'. Because the laser beam 64 is necessarily kept closer to the cutting edges 52' to achieve the smaller width W, the laser-hardened regions 70" extend upwardly along a portion of the beveled surfaces 48' a length L of approximately 0.06 inches. Again, this is due to the smaller amount of material adjacent the cutting edges 52'.

Figure 10:
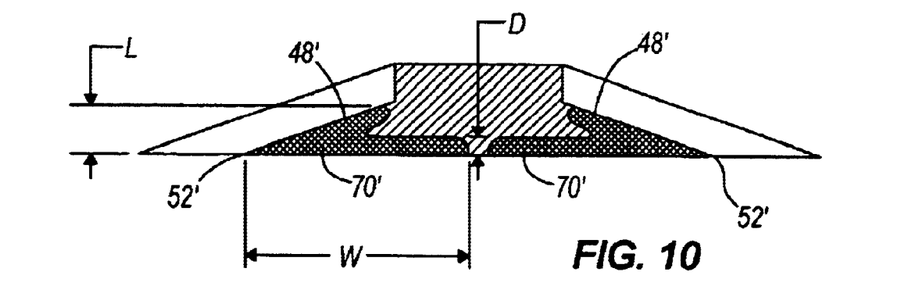
FIG. 10 is a section view taken along line 10—10 of FIG. 6.

FIG. 10 illustrates the laser-hardened regions 70' formed in the roots between the third and fourth teeth T from the apex 30' on either working portion 26'. As seen in FIG. 10, the laser-hardened regions 70' have a depth D of approximately 0.010–0.040 inches, and more preferably of approximately 0.020 inches. Each of the regions 70' has a width W of approximately 0.38 inches from the cutting edges 52' of the roots. The laser-hardened regions 70' extend upwardly along the beveled surfaces 48' of the roots a length L of approximately 0.06 inches.

Figure 11:
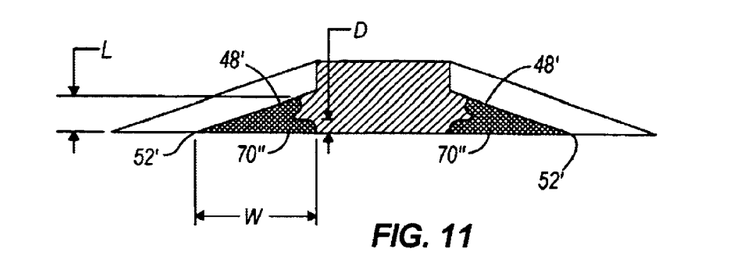
FIG. 11 is a section view similar to FIG. 10 showing an alternative embodiment of the invention.

FIG. 11 illustrates alternate laser-hardened regions 70" formed in the roots between the third and fourth teeth T from the apex 30' on either working portion 26'. The depth D remains approximately 0.010–0.040 inches, and more preferably of approximately 0.020 inches, however, each of the regions 70" has a width W of approximately 0.25 inches from the cutting edges 52' of the roots. The laser-hardened regions 70" extend upwardly along the beveled surfaces 48' of the roots a length L of approximately 0.06 inches.

Figure 12:
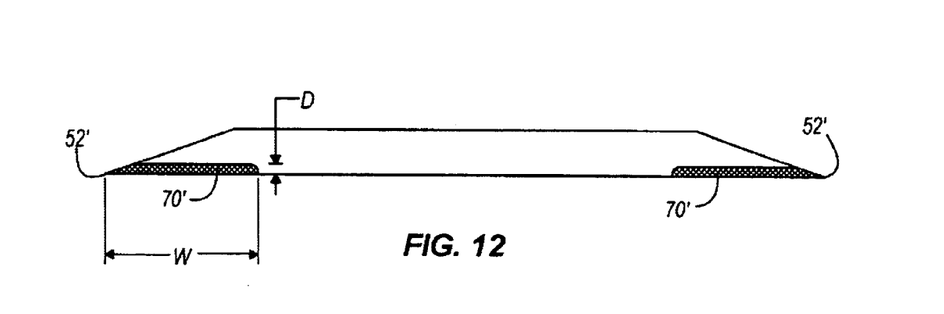
FIG. 12 is a section view taken along line 12—12 of FIG. 6 with the section lines removed for clarity.

FIG. 12 illustrates the laser-hardened regions 70' formed at the eleventh teeth T from the apex 30' on either working portion 26'. As seen in FIG. 12, the laser-hardened regions 70' have a depth D of approximately 0.010–0.040 inches, and more preferably of approximately 0.020 inches. Each of the regions 70' has a width W of approximately 0.50 inches from the cutting edges 52'.

Figure 13:
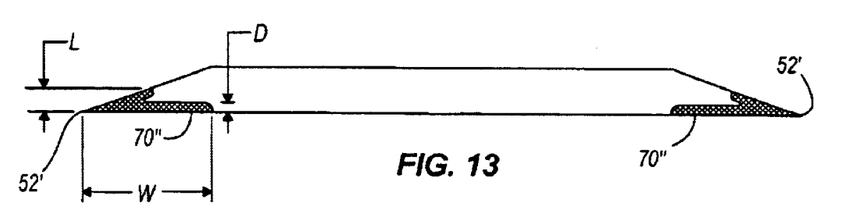
FIG. 13 is a section view similar to FIG. 12, with the section lines removed for clarity, showing an alternative embodiment of the invention.
Figure 14:
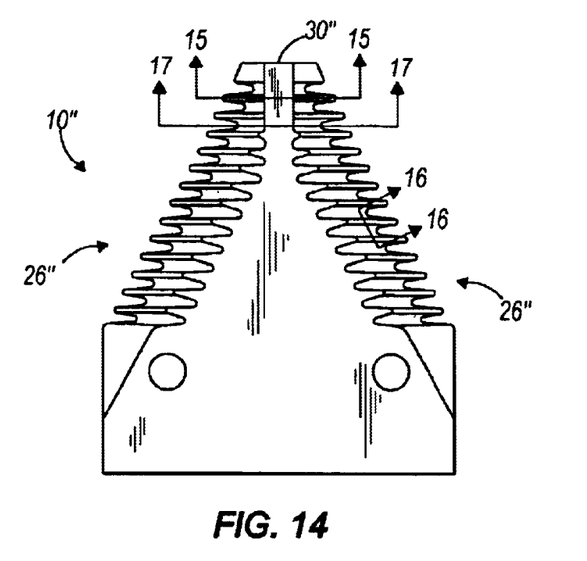
FIG. 14 is a top view of an alternative sickle section embodying the invention.

FIG. 13 illustrates alternate laser-hardened regions 70" formed at the eleventh teeth T from the apex 30'. The depth D remains approximately 0.010–0.040 inches, and more preferably approximately 0.020 inches, however, each of the regions 70" has a width W of approximately 0.38 inches from the cutting edges 52'. Because the laser beam 64 is necessarily kept closer to the cutting edges 52' to achieve the smaller width W, the laser-hardened regions 70" extend upwardly along portions of the beveled surfaces 48' a length L of approximately 0.06 inches. Again, this is due to the smaller amount of material adjacent the cutting edges 52'.

As can be seen from the variations shown in FIGS. 5–13, the size and configuration of the laser-hardened regions can be varied as desired to suit the needs of any specific cutting application. Variations in the materials, the laser, and the laser application process will impact the configuration of the laser-hardened regions and can be optimized as needed.

Figure 15:
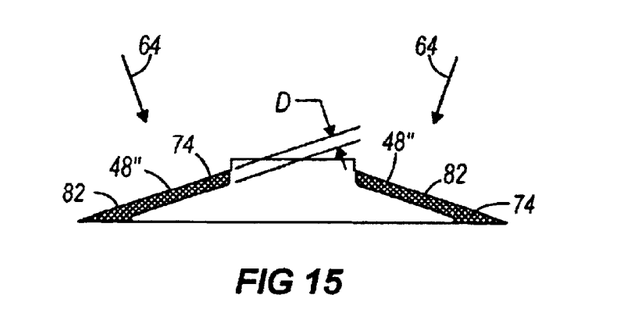
FIG. 15 is a section view taken along line 15—15 of FIG. 14 with the section lines removed for clarity.
Figure 16:
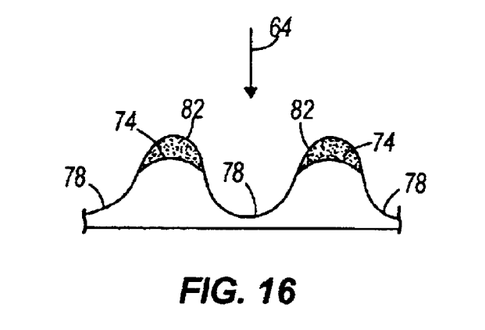
FIG. 16 is a section view taken along line 16—16 of FIG. 14 with the section lines removed for clarity.
Figure 17:
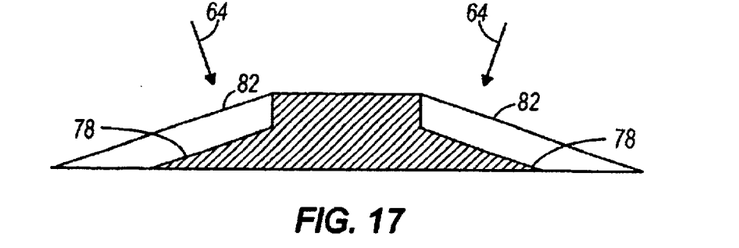
FIG. 17 is a section view taken along line 17—17 of FIG. 14.

For example, FIGS. 14–17 illustrate a sickle section 10" that is substantially similar to the section 10' except that the laser-hardening process is modified to harden a different portion of the section 10". As best seen in FIGS. 15 and 17, the laser beam (represented schematically by the arrows 64), is applied to the cutting surface 48" of each of the working portions 26" at a substantially perpendicular angle of incidence.

FIG. 15 illustrates laser-hardened regions 74 formed on the upper surfaces 82 of the second teeth T from the apex 30". The depth D of the regions 74 is approximately 0.010–0.040 inches, and more preferably, approximately 0.020 inches. The regions 74 extend substantially along the entire upper length of the respective teeth T. FIG. 17 illustrates a cross-section taken through the roots between the third and fourth teeth T. The upper surfaces 78 of the roots remains substantially unhardened (or less hardened) by the laser beams 64, which are passing above at a greater distance from the upper surfaces 78 of the roots than from the upper surfaces 82 of the teeth T. FIG. 16 better illustrates the resulting laser hardening effect achieved on the section 10", in which the teeth T are laser hardened more than the roots. As used herein and in the appended claims, stating that the teeth T are laser hardened "more than" the roots means that the depth of any laser hardening occurring on the teeth T is greater than the depth of any laser hardening occurring in the roots. Additionally, it is envisioned that stating that the teeth T are laser hardened "more than" the roots can mean that the teeth T are laser hardened to some extent while the roots are not laser hardened at all.

As illustrated in FIG. 16, the upper surfaces 82 of the teeth T are laser hardened to obtain laser-hardened regions 74, while the upper surfaces 78 of the roots do not receive a laser-hardened region. Instead, the upper surfaces 78 of the roots are only hardened by the initial hardening process or through hardening step described above.

By laser hardening the upper surfaces 82 of the teeth T more than the upper surfaces 78 of the roots, the teeth T are harder than the roots, producing a preferential wear pattern. More specifically, if the teeth and the roots had the same hardness, the teeth would wear faster than the roots because the teeth have more contact with the fibrous stalks of the crop being cut, sand, and other debris than the roots. The result would be that the teeth would substantially wear down to the roots before the roots would begin to wear, effectively eliminating the serrations/teeth altogether. With the laser-hardened pattern of the section 10", the harder teeth will wear slowly, but the roots, which are softer than the teeth, will wear more than they would if they were the same hardness as the teeth. By allowing the softer roots to wear as the harder teeth wear, the serrated working portions 26" substantially maintain their serrations over the life of the section 10".

This laser hardening effect on the serrated working portions 26" can be achieved inherently by the difference in distance between the upper surfaces of the roots 78 and the lens of the laser 60, and the upper surfaces 82 of the teeth and the lens of the laser 60. The change in distance from the work piece effects the power density of the laser 60. More likely, however, the laser 60 will have to be moved further from the working portions 26" (when passing over the roots) and/or closer to the working portions 26" (when passing over the teeth) to achieve this effect. Of course, the section 10" could be moved with respect to the laser 60 instead. Alternatively, the laser 60 could be pulsed on and off as described above, or the laser's intensity could be varied during beam travel to achieve this effect.

FIGS. 18 and 19 illustrate partial cross-sectional views similar to FIG. 4, taken through an alternate sickle section 10''' having serrations formed in the bottom surface 42'''. The serrations define teeth T and roots between successive teeth T. FIG. 18 is a cross-section taken through a tooth T, while FIG. 19 is a cross-section taken through an adjacent root. In FIG. 18, a laser-hardened region 86 is formed in the lower surface 90 of the tooth T (in a manner similar to that described above with respect to the region 70 shown in FIG. 4), while in FIG. 19, the lower surface 94 of the root remains substantially unhardened (or less hardened) by the laser 60. With the laser beam 64 being applied to the bottom surface 42''' of the working portions 26''', this laser-hardening effect can be achieved in the same manner discussed above with respect to the section 10", and produces a similar preferential wear pattern to maintain the serrations over the life of the section 10'''.

Various features of the invention are set forth in the following claims.

What is claimed is:

1. A reciprocating cutting blade comprising:
a body portion having an top surface, a bottom surface, a longitudinal axis, a first working portion extending at an angle to the longitudinal axis and defining a first cutting surface, a second working portion extending at an angle to the longitudinal axis and defining a second cutting surface, and a laser-hardened region extending along at least part of one of the first and second working portions.

2. The reciprocating cutting blade of claim 1, wherein the first and second working portions are in substantially mirror relation to one another with respect to the longitudinal axis.

3. The reciprocating cutting blade of claim 1, wherein the laser-hardened region extends along at least part of both of the first and second working portions.

4. The reciprocating cutting blade of claim 1, wherein the laser-hardened region extends along the bottom surface, the laser-hardened region having a depth D.

5. The reciprocating cutting blade of claim 4, wherein the depth D is less than or equal to 0.040 of an inch from the bottom surface.

6. The reciprocating cutting blade of claim 1, wherein the working portions are serrated to include alternating teeth and roots.

7. The reciprocating cutting blade of claim 6, wherein the teeth in the laser-hardened region are laser hardened more than the roots.

8. The reciprocating cutting blade of claim 7, wherein the teeth and roots are formed in the bottom surface adjacent each of the first and second working portions.

9. The reciprocating cutting blade of claim 7, wherein the teeth and roots are formed in the cutting surface of each of the first and second working portions.

10. The reciprocating cutting blade of claim 1, wherein the laser-hardened region extends along at least part of one of the first and second cutting surfaces, the laser-hardened region having a depth D.

11. The reciprocating cutting blade of claim 10, wherein the depth D is less than equal to 0.040 of an inch from the respective cutting surface.

12. The reciprocating cutting blade of claim 1, wherein the hardness of the laser-hardened region is in the range of 60 $R_c$ to 70 $R_c$.

13. A method of manufacturing a reciprocating cutting blade defining a longitudinal axis, the method comprising:
   providing a cutting blade having a first working portion extending at an angle to the longitudinal axis and a second working portion extending at an angle to the longitudinal axis;
   heat treating the first and second working portions; and
   exposing a region of at least one of the heat-treated first working portion and the heat-treated second working portion to a beam of laser radiation such that the exposed region is laser hardened.

14. The method of claim 13, wherein providing the cutting blade includes providing a cutting blade with the first and second working portions in substantially mirror relation to one another with respect to the longitudinal axis.

15. The method of claim 13, wherein exposing a region of at least one of the first and second working portions to the beam of laser radiation includes exposing a region of both the first working portion and the second working portion to the beam of laser radiation.

16. The method of claim 13, wherein the cutting blade includes a bottom surface, and wherein exposing a region of at least one of the first and second working portions to the beam of laser radiation includes exposing the bottom surface adjacent at least one of the first working portion and the second working portion to the beam of laser radiation.

17. The method of claim 13, wherein providing the cutting blade includes providing a cutting blade having serrated first and second working portions with alternating teeth and roots.

18. The method of claim 17, wherein exposing a region of at least one of the first working portion and the second working portion to the beam of laser radiation includes laser hardening the teeth in the exposed region more than the roots.

19. The method of claim 18, wherein providing the cutting blade having serrated first and second working portions with alternating teeth and roots includes providing a cutting blade with the teeth and roots formed in a bottom surface of the cutting blade.

20. The method of claim 18, wherein providing the cutting blade having serrated first and second working portions with alternating teeth and roots includes providing a cutting blade with the teeth and roots formed in respective cutting surfaces of the cutting blade.

21. The method of claim 18, wherein exposing a region of at least one of the first working portion and the second working portion to the beam of laser radiation includes turning the beam on as the beam passes by a tooth and turning the beam off as the beam passes by a root.

22. The method of claim 18, wherein exposing a region of at least one of the first working portion and the second working portion to a beam of laser radiation includes spacing the beam a distance from the teeth and roots so that the teeth in the exposed region are laser hardened more than the roots.

23. The method of claim 13, wherein the first and second working portions each define a cutting surface, and wherein exposing a region of at least one of the first and second working portions to the beam of laser radiation includes exposing the respective cutting surface to the beam of laser radiation.

24. The method of claim 13, further including providing the cutting blade with a layer of oxide.

25. The method of claim 13, wherein exposing a region of at least one of the first working portion and the second working portion to the beam of laser radiation results in the exposed region having a hardness in the range of 60 $R_c$ to 70 $R_c$.

* * * * *